United States Patent
Braun

(10) Patent No.: US 12,224,993 B2
(45) Date of Patent: Feb. 11, 2025

(54) RECURSIVE CRYPTOGRAPHY PROTOCOL

(71) Applicant: Avarok Corporation, Wilmington, DE (US)

(72) Inventor: Thomas Braun, Charlotte, NC (US)

(73) Assignee: AVAROK CORPORATION, Wilmington, DE (US)

( * ) Notice: Subject to any disclaimer, the term of this patent is extended or adjusted under 35 U.S.C. 154(b) by 322 days.

(21) Appl. No.: 17/839,066

(22) Filed: Jun. 13, 2022

(65) Prior Publication Data

US 2023/0403261 A1 Dec. 14, 2023

(51) Int. Cl.
*H04L 9/40* (2022.01)
*H04L 9/06* (2006.01)
*H04L 9/08* (2006.01)
*H04L 9/32* (2006.01)

(52) U.S. Cl.
CPC ........ *H04L 63/0435* (2013.01); *H04L 9/0618* (2013.01); *H04L 9/0861* (2013.01); *H04L 9/3226* (2013.01)

(58) Field of Classification Search
None
See application file for complete search history.

(56) References Cited

U.S. PATENT DOCUMENTS

| | | | | |
|---|---|---|---|---|
| 10,872,144 B1* | 12/2020 | Kalibjian | ............... | H04L 9/0891 |
| 11,095,442 B1* | 8/2021 | Mandich | ............... | H04L 9/0662 |
| 11,569,993 B2* | 1/2023 | Garcia Morchon | .. | H04L 9/3093 |
| 2003/0081787 A1* | 5/2003 | Kallahalla | ............. | H04L 9/0891 |
| | | | | 380/278 |
| 2020/0186331 A1* | 6/2020 | Thompson | ............ | H04L 9/0656 |
| 2020/0259647 A1* | 8/2020 | Goncalves | ................ | H04L 9/14 |

OTHER PUBLICATIONS

Biryukov et al., "Argon2: new generation of memory-hard functions for password hashing and other applications", IEEE European Symposium on Security and Privacy, 11 pages, 2016.

* cited by examiner

*Primary Examiner* — Philip J Chea
*Assistant Examiner* — Bin Qing Zheng
(74) *Attorney, Agent, or Firm* — Panitch Schwarze Belisario & Nadel LLP

(57) ABSTRACT

Aspects of the present disclosure may address cryptographic methods and systems using redundant encryption and re-keying to provide security in a post-quantum computing environment. A trusted server may initially establish encrypted communications with users, using symmetric key matrices established with the users. The trusted server may be used to establish symmetric key matrices between users and to assist in the users in establishing communications. All of the symmetric keys in a given symmetric key matrix may be used to encrypt plaintext for transmission. Re-keying may be used to generate new symmetric key matrices on a periodic basis or upon initiation by a node or based on a selected secrecy mode. Establishment of symmetric key matrices and re-keying may involve the use of post-quantum key encapsulation mechanisms.

22 Claims, 10 Drawing Sheets

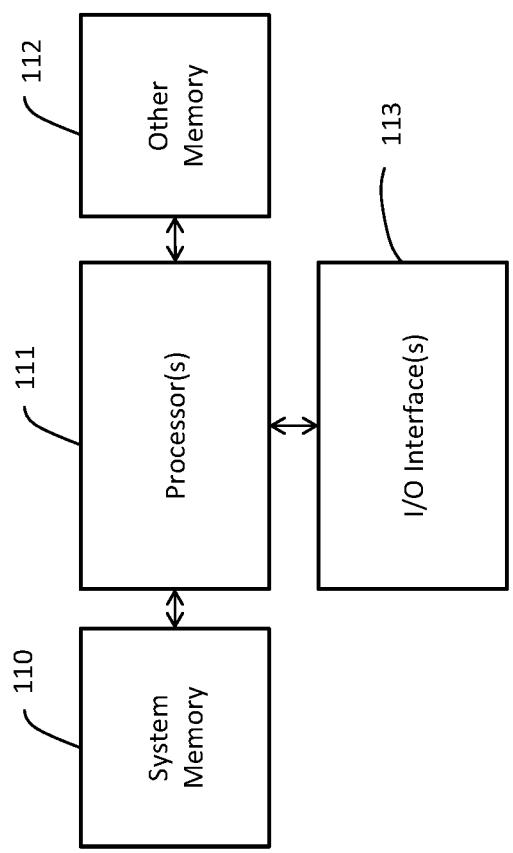

RECURSIVE CRYPTOGRAPHY PROTOCOL

FIELD

Some aspects of this disclosure may relate to the secure generation of symmetric cryptographic keys using recursive methods.

BACKGROUND

In 1995, Peter Shor discovered vulnerabilities in elliptical curve cryptography due to its inherent use of integer prime factorization. As Shor theoretically proved, using sufficiently many qubits, a quantum computer could find in feasible time the prime factors of the large integers used in elliptical curve cryptography using what is now known as Shor's algorithm. This would be disastrous because the networks then (and today) still widely use elliptical curve cryptography.

Imagine an adversary discovering Shor's algorithm in 1995. Like anybody, the adversary could access a public network and store encrypted packets into a long-term database. While in 1995, the adversary would not be able to decrypt the captured information, all the adversary would have to do is wait until a powerful enough computer, such as a quantum computer, was available, and thereafter, the adversary could retroactively decrypt the packets. This implies that irreversible damage could occur once quantum computers mature. While nothing can be done about data already captured, the most secure policy would be to secure further transmissions using quantum-secure communication to prevent further damage.

Therefore, it may be desirable to devise cryptographic methods that may be put into use now and in the future, to guard against increases in computing power, such as via quantum computing.

SUMMARY

Various aspects of the present disclosure may relate to a platform for developers to secure communications in a world of emerging quantum computers. In order to achieve this, post-quantum key encapsulation mechanisms (KEMs) and encryption mechanisms may be used to securely establish symmetric keys between users (e.g., "Alice" and "Bob," or equivalently, "User A" and "User B"). These KEMs may form part of a key generation protocol that may initially make use of a secure server to establish symmetric keys between the server and each user. After this, a first user may establish one or more symmetric keys between the first user and a second user, initially using the secure server as an intermediary. Following this, encrypted communications between the two users may begin, using the one or more symmetric keys. Periodically, or upon initiation by one of the users in the communication, re-keying may occur, in which a new (set of) symmetric keys, based on the previous symmetric key(s).

Various aspects of the present disclosure may take the form of hardware, software, firmware, or combinations thereof, and software forms may be in the form of instructions embodied on a non-transitory computer-readable medium, such as, but not limited to, various forms of memory.

BRIEF DESCRIPTION OF THE DRAWINGS

Various aspects of this disclosure will now be described in detail in conjunction with the accompanying drawings, in which:

FIG. 1A shows a conceptual block diagram of a system that may be used to implement various aspects of FIG. 1, according to aspects of the present disclosure;

DETAILED DESCRIPTION

Figure 1:
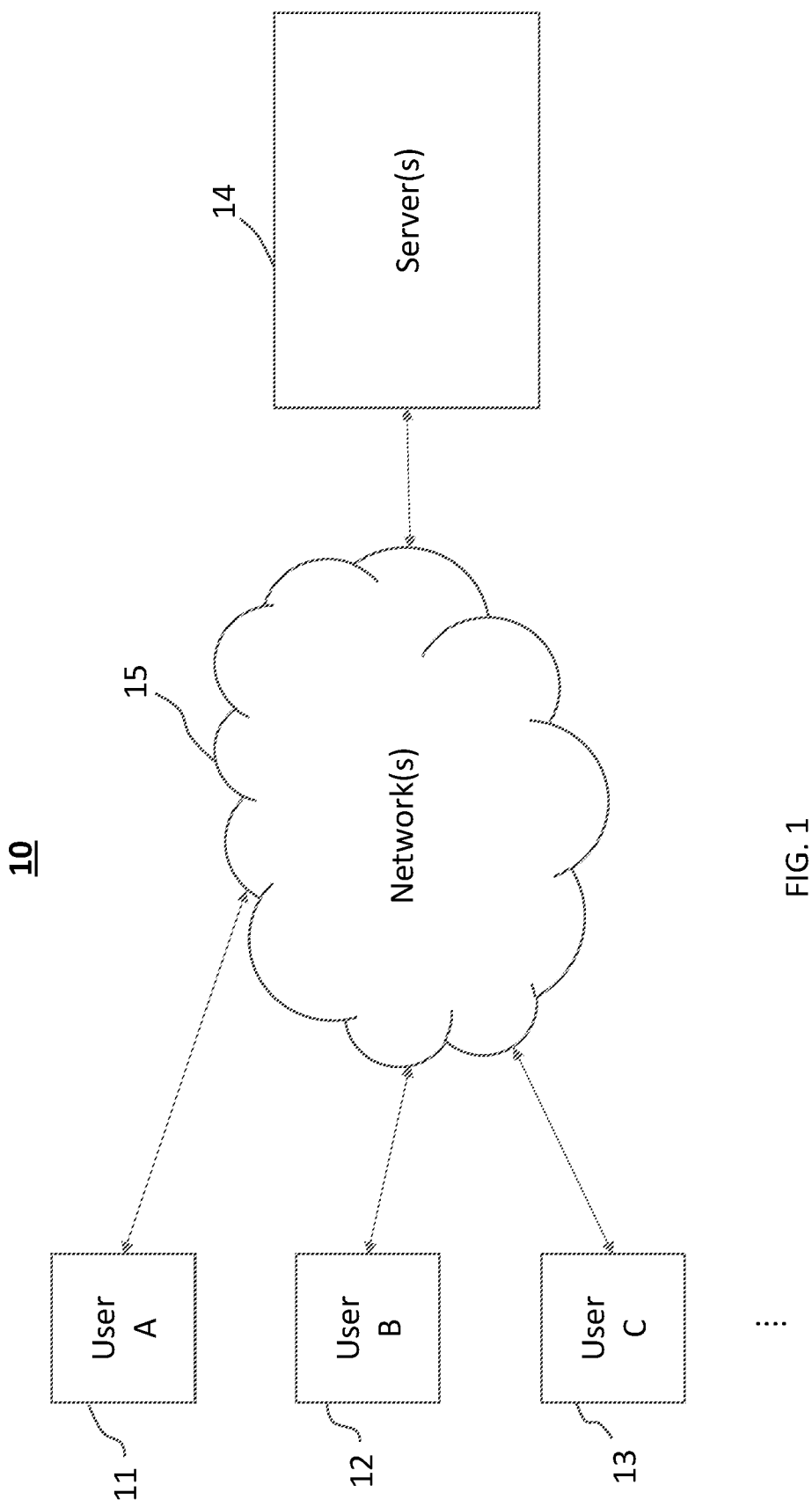
FIG. 1 shows an example of a system in which various aspects of the present disclosure may be implemented.

Work by theoretical cryptographers around the world has already yielded an array of possible KEMs. The National Institute of Standards and Technology (NIST) started a post-quantum competition in 2016 to update both public key cryptography and signature schemes for future standardization, allowing these cryptographers to submit, receive critique, and update their algorithms throughout the competition. As of round 3, Classic McEliece, NTRU, Crystals-Kyber, and Saber KEMs remain in the competition. The finalists are expected to be revealed in 2022, where the head cryptographer Dustin Moody expects to select "several" KEMs.

According to one aspect of the present disclosure, the NTRU, Crystals-Kyber, and Saber KEMs may be used. While Classic McEliece and its variants may also be used, they have a disadvantage due to disproportionately large key sizes implicated in the transmission process.

It is noted that the aforementioned key encapsulation mechanisms that may be applied in the discussion below are all publicly known and are available for public access (including source code) via the Internet. In general, these key encapsulation mechanisms include several different aspects/functions grouped together and considered to be "a key encapsulation mechanism," and one of skill in the art would understand what aspects of the key encapsulation mechanisms may be being applied in various aspects of the present disclosure. Aspects of how and when they are used, however, may constitute novel aspects of the present disclosure.

According to a further aspect of the present disclosure, key derivation functions may be used to create further keys from the symmetric keys established from post-quantum KEMs. As a specific example, which will be used in the discussion below (but which is not intended to be limiting), the secure hashing algorithm III (SHA3) may be used for deriving keys. SHA3 was selected by NIST in 2015 from the Keccak family of hash functions. As non-limiting examples, SHA3-256 or SHA3-512 may be used, and which one is used in a particular situation may be determined based on an implementation.

Passwords may also be used, according to a further aspect of the present disclosure. For example, Argon2 may be used as an alternative to the common pbkdf2 (used in Signal) or scrypt (used in Wickr) password-based hash functions because it is generally considered stronger and recommended by the Internet Engineering Task Force (IETF); however, other password-based hash functions may be used, as well. Argon2id is a special version of Argon2 that runs both Argon2i (which may provide resistance to side-channel attacks) and Argon2d (which may provide resistance to GPU attacks) over an input password in order to balance protection against a variety of attack vectors. Argon2id, and may use the following parameters:

| Parameter | Type |
| --- | --- |
| password | bytes |
| salt | bytes |
| parallelism | integer |
| tag length | integer |
| memory size | integer (KB) |
| iterations | integer |
| key | bytes |
| associated data | bytes |

According to a further aspect of the present disclosure, a built-in autotuner may automatically determine the optimal parameters for the Argon2id password hashing function given a target time (typically between 0.5 and 1.0 seconds, but can be shorter or longer, depending on the application requirements determined by the developer). An optimal execution time may be determined based on information found in the original paper on Argon2 by Biryukov et al. (A. Biryukov et al., "Argon2: New generation of memory-hard functions for password hashing and other applications," 2016 *European Symposium on Security and Privacy (EuroS&P)*, pp. 292-302, 2016).

A protocol according to various aspects of the present disclosure may support the use of two encryption algorithms that may provide authenticated encryption with associated data (AEAD) at, e.g., 256-bit levels: AES-256-GCM-SIV and Xchacha20-Poly1305. The SIV variant of AES-256-GCM may provide nonce misuse resistance for additional security. The X variant of Chacha20-Poly1305 may also provide nonce misuse resistance for additional security. By letting the developer choose between the two AEADs, performance may be fine-tuned depending on the target machines. On machines without dedicated advanced encryption standard (AES) instructions, Xchacha may run faster (e.g., on mobile and/or IoT devices).

Before describing how the aforementioned primitives may be used together in order to construct an overall cryptographic protocol, it is useful to define the following terms, which will be discussed in further detail below. Note that these definitions may be relative to one another and that increases or decreases in sizes of constructs may be contemplated and may result in corresponding increases or decreases in size in other constructs (e.g., if the number of bits assigned to the security level is decreased to 4 or increased to 16, fewer or more symmetric keys may be established per key exchange, and other associated quantities may vary accordingly).

Entropy Store. A set of cryptographically-secure random bytes that is symmetric between two endpoints used to derive nonces. Transferred in encrypted form. Endowed with version n.

Security Level. An unsigned 8-bit integer, S, that determines the number of symmetric keys, S+1, established per key exchange. Allows messages to use multi-layered encryption up to S+1 times. Default S=0.

Chain Key. A recursively-generated key that is dependent upon the symmetric key established at the end of each KEM negotiation as well as the previous chain key.

Meta Chain Key. Generated by taking the hash of the concatenation of every chain key in a symmetric key matrix.

Version. The version endowed unto a symmetric row or matrix.

Symmetric Row. A 4-tuple endowed with version n containing a key for a first user ("User A"), a key for a second user ("User B"), a chain key, and an entropy store. All elements in the row are symmetric between endpoints.

Symmetric Key Matrix. a matrix endowed with version n and security level S containing S+1 symmetric rows.

Furthermore, the following notation will be used in the discussion below:

| Notation | Definition | Notes |
| --- | --- | --- |
| $\varphi_{256}(x)$ | SHA3-256(x) | One-way mapping of an input, x, to 256 bits |
| $\varphi_{512}(x)$ | SHA3-512(x) | One-way mapping of an input, x, to 512 bits |
| $\rho(x)$ | Argon2id(x, C) | Password hashing algorithm with parameters C |
| A∥B | concat(A, B) | Concatenation of two byte sequences A and B |
| $(A, B)_n$ | split(X, n) | Split a byte sequence X at position n to obtain a tuple (A, B) |
| A ⊕ B | ∀a ∃A, ∀b ∃, a ⊕ b | Element-by-element exclusive-OR of byte sequence A with byte sequence B |
| $[E]_n$ | Entropy store for symmetric row n | See definition above |
| S | Security Level (unsigned 8-bit integer) | A value on the range [0, 256); again, as noted above, fewer or more bits assigned to S may result in different ranges of values for S |
| count(S) | S + 1 | Determines the number of shared symmetric keys that should be generated by a key encapsulation mechanism given security level S |
| [K]n | A symmetric key matrix with count(S) rows by 4 columns. Version n | A matrix where each row holds a symmetric key for User A, User B, a chain key, and an entropy store $[E]_n$, respectively. Access notation is $[K]_n$ [row] [column] |
| λ | 1 if User A, 2 if User B | Used to access a key in column λ of [K]n denoted by $[K]_n$ [row][λ] |
| θ(P,K) | AEAD algorithm | Encrypts the plaintext P using symmetric key K |
| ω(C, K) | AEAD algorithm | Decrypts the ciphertext C using symmetric key K |
| [·] | Column array | A column array of (generally) multi-bit entries (so on the bit-wise level, this is a binary matrix, but on an entry-wise level, it is a column vector). Used below for a column array to be concatenated with one or more other column arrays into a matrix of entries. |

The following subroutines may be incorporated into various aspects of a cryptographic protocol according to various aspects of the present disclosure:

DeriveKeysInitial($K_0$)

$$T_0 := \varphi_{512}(K_0)$$
$$(K_{UserA,0}, K_{UserB,0})_{32} = \text{split}(T_0, 32)$$
$$K_{chain0} := \varphi_{256}(K_{UserA,0} \oplus K_{UserB,0})$$

-continued

```
            return K_{UserA,0}, K_{UserB,0}, K_{chain0}]
    DeriveMetaChainKey_n ([K]_{(n-1)}, S_{max})
        C_t := [K]_{n-1} [0][3] ∥ .. ∥ [K]_{n-1} [S_{max}][3]
            K_{meta(n)} = φ_{256}(C_t)
            return K_{meta(n)}
DeriveKeysChain_n (K_{UserA(n-1)}, K_{UserB(n-1)}, K_{meta(n-1)}, K_n)

T_n := φ_{512}(K_{meta(n-1)}∥K_n)
        (T_{UserA(n)}, T_{UserB(n)})_{32} = split(T_n, 32)
        K_{UserA(n)} := φ_{256} (K_{UserA(n-1)} ⊕ T_{UserA(n)})
        K_{UserB(n)} := φ_{256} (K_{UserB(n-1)} ⊕ T_{UserB(n)})
        K_{chain(n)} := φ_{256} (K_{UserA(n)} ⊕ K_{UserB(n)})
            return [K_{UserA(n)}, K_{UserB(n)}, K_{chain(n)}]
            Encrypt([K]_n, j, λ, S, P)

if (j = S) then return θ(P, K_n[S][λ])
            return Encrypt([K]_n, , j + 1, θ(P, K_n[j][λ]) )
                Decrypt([K]_n, λ, S, P)

if (S = 0) then return ω(P, K_n[0][λ])
            return Decrypt([K]_n, λ, S − 1, ω(P, K_n[S][λ]))
```

Note that the above routines may be applicable to establishing keys between a given user 11-13 and a trusted server 14. Therefore, in such cases, "User A" may represent the given user 11-13, and "User B" may represent the trusted server 14.

Figure 2:
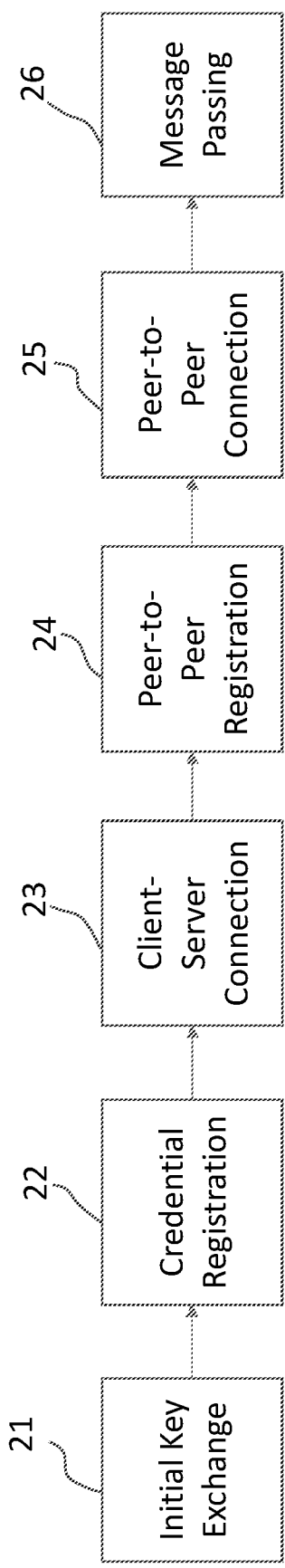
FIG. 2 shows a conceptual flow diagram that may be used in implementing various aspects of the present disclosure.

Given the above definitions, a cryptographic protocol according to various aspects of the present disclosure will now be described. As shown in FIG. 2, the protocol 20 may be split into multiple phases: an initial client-to-server key exchange 21, a client-server credential registration phase 22 (elements 21 and 22 may, together, be thought of as a client-to-server registration phase), a client-to-server connection phase 23, a peer-to-peer registration phase 24, a peer-to-peer connection phase 25, and a message-passing phase 26 (the latter of which may be used by both client-to-server and peer-to-peer connections after a connection is established). These will be described below in detail.

Prior to describing the various components of the protocol, it may be useful to provide a context for the protocol. Overall, the protocol may be implemented in a communication system (which may be any type of communication system, including a private or public communication system), a non-limiting example of which is shown in FIG. 1. System 10 may include multiple users 11-13, of which pairs of users may wish to communicate securely with each other over one or more networks 15. System 10 may further include a trusted/secure server 14 that may be used in various stages of a cryptographic protocol according to aspects of the present disclosure.

Various aspects of the present disclosure are described in terms of sequences of actions that may be performed by, for example, elements of a computing device. It should be recognized by those skilled in the art that various sequences of actions described herein may be performed by specific circuits (e.g., but not limited to, application specific integrated circuits (ASICs)) and/or by program instructions executed by at least one processor. Additionally, such sequences of actions may be embodied entirely as executable instructions stored on any form of computer-readable storage medium, including such non-transitory storage media as memory devices (e.g., read-only memory (ROM), random access memory (RAM), disk drives, flash memory, magnetic tape, etc.) such that execution of the instructions may enable the at least one processor to perform the functionality described herein. Furthermore, the sequence of actions described herein may be embodied in a combination of hardware and software. Thus, various aspects of the present disclosure may be embodied in a number of different forms, all of which have been contemplated to be within the scope of the claimed subject matter. In addition, various aspects of the present disclosure may be described herein as, for example, a computer or processor or processing device configured to perform the described actions.

FIG. 1A provides an illustrative, non-limiting example of a system in which various aspects of the present disclosure may be implemented. The system may include one or more processors 111, memory 110, 112, and input/output (I/O) 113. The processor(s) 111 may be coupled to the memory 110, 112 and the I/O 113. The memory 110, 112 may include the types of memory described above. The system memory 110 may be used to store system software (e.g., operating system, basic input/output system (BIOS), etc.) and may be physically implemented in one or more memory devices. Other memory 112 may be used to store application software, data, etc. Memory 110, 112 may be physically embodied as a single memory device/module or as multiple memory devices/modules. The I/O 113 may include user I/O devices, such as, but not limited to, displays, touchscreens, keyboards, mice, trackballs, keypads, etc. The I/O 113 may further include interfaces with communication networks (e.g., network cards or other modules, or individual components such as transmitters, receivers, antennas, modems, codecs, photodiodes, etc.).

Figure 3:
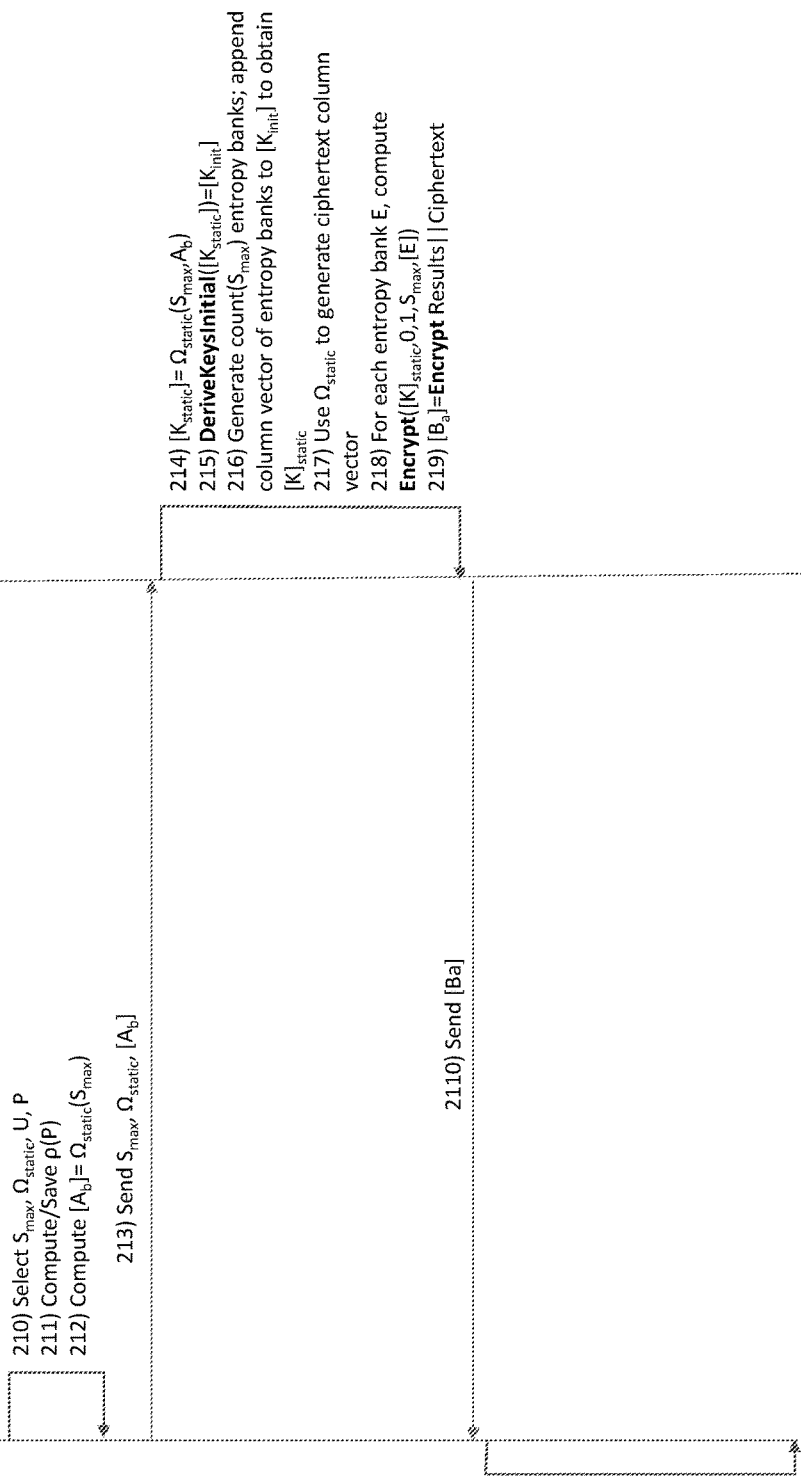
FIG. 3 shows an example of a flow diagram that shows an example implementation of a component of FIG. 2, according to aspects of the present disclosure.

Returning now to the protocol itself, as noted above, the protocol may begin with client-server registration 21, 22, which may begin with an initial key exchange 21 between a client (user device 11-13) and a server 14. FIG. 3 shows an example of such an initial key exchange 21 according to aspects of the present disclosure. As shown in FIG. 3, prior to beginning the initial key exchange, proper, a client, A (which may correspond to User A 11 of FIG. 1), may select a maximum static session security level $S_{max}$ and an initial KEM, $\Omega_{static}$ 210. A may further select a username U and a password P 210. P may be saved to memory as ρ(P) 211. Client A may then initiate the actual key exchange process 21, which will also be referred to elsewhere herein. Note that any user 11-13 wishing to engage in secure communications using the cryptographic protocol disclosed herein may need to individually perform client-server registration 21, 22 and client-server connection 23, which may provide for the establishment of keys that may be used subsequently in peer-to-peer phases.

Next, A may compute count ($S_{max}$) and may determine static public keys $P_{static}$ using $\Omega_{static}$ exactly count ($S_{max}$) times 212 (this is shown in the drawings as $\Omega_{static}(S_{max})$) When the resulting static public keys are used to form a (binary) matrix, the matrix may take the following form:

$$\vec{A_b} = \begin{bmatrix} P_{static0} \\ \vdots \\ P_{static(S_{max})} \end{bmatrix}$$

$\vec{A_b}$ may then be sent, along with the selected value of $S_{max}$ and an indication of the selected KEM $\Omega_{static}$, to a trusted server 14, which may be able to communicate with both User A 11 and a user with whom User A wishes to communicate securely (e.g., User B) via an underlying network protocol, which may be, for example, the Transmission Control Protocol (TCP) or the Transport Layer Security (TLS); note that it may be possible that User A 11 and User B 12 may establish their keys/connections with different servers 14, in which case the servers 14 may need to establish keys/connections with each other (and subsequent operations to be discussed, for example, conveying symmetric keys, may need to involve multi-hop communications, through both servers 14, where the communication between servers and between the users and their servers are all secured by a cryptographic protocol according to aspects of the present disclosure).

Upon receiving the above public keys and security level and KEM information from User A, the server 14 may use $\Omega_{static}$ to generate count ($S_{max}$) symmetric keys $K_{static}$ to obtain the column $[K_{static}]$ 214 (the drawings use the more compact notation, $\Omega_{static}(S_{max}, A_b)$ to represent this). Next, for each row in $[K_{static}]$, server 14 may execute the subroutine DeriveKeysInitial (K static) to obtain the matrix $[K_{init}]=([K_{UserA}], [K_{UserB}], [K_{chain}])$ 215. Thereafter, server 14 may generate count (S max) entropy banks $[E_{static}]$ to obtain the column $[[E_{static}]]$ and may then append the column $[[E_{static}]]$ to $[K_{init}]$ to obtain the static symmetric key matrix $[K_{static}]$ 216, which is shown in expanded form as:

$$[K]_{static} = \begin{bmatrix} K_{UserA,0} & K_{UserB,0} & K_{chain,0} & [E]_0 \\ \vdots & \vdots & \vdots & \vdots \\ K_{UserA(S_{max})} & K_{UserB(S_{max})} & K_{chain(S_{max})} & [E]_{S_{max}} \end{bmatrix}$$

We may now wish to enable User A 11 to also have a copy of $[K]_{static}$, to thereby establish a symmetric key matrix between the server 14 and User A 11. To accomplish this, server 14 may use $\Omega_{static}$ to obtain count ($S_{max}$) ciphertexts C to form a column [C] 217. Next, for each entropy bank [E] in $[K_{static}][row]$ [4], server 14 may execute the subroutine Encrypt ($[K]_{static}$, 0,1, $S_{max}$, [E]) to obtain the encrypted column $[[\widehat{E}]]$ 218. Server 14 may then concatenate [C] to $[\widehat{E}]$ 219 to obtain the matrix:

$$\vec{B_a} = \begin{bmatrix} C_0 & \widehat{E}]_{static0} \\ \vdots & \vdots \\ C_{S_{max}} & \widehat{E}]_{static(S_{max})} \end{bmatrix}$$

Server 14 may then send $\vec{B_a}$ to User A over the underlying protocol (again, e.g., TCP or TLS) 2110. Once User A has received $\vec{B_a}$, for each C in $\vec{B_a}[row][1]$, User A 11 may use $\Omega_{static}$ to obtain count ($S_{max}$) symmetric keys $K_{static}$ to obtain the column $[K_{static}]$ 2111. Next, for each row in $[K_{static}]$, User A 11 may execute the subroutine DeriveKeysInitial ($K_{static}$) (i.e., using $K_{static}$ instead of $K_0$) to obtain the matrix ($[K_{UserA}], [K_{UserB}], [K_{chain}]$) and may decrypt each encrypted entropy bank column $[[\widehat{E}]]$ in $\vec{B_a}[row]$ [2] using the subroutine Decrypt ($[K]_{static}$, 1, $S_{max}$, $[[\widehat{E}]]$) to obtain the decrypted entropy bank column [[E]] 2112. Finally, User A 11 may concatenate [[E]] to the matrix ($[K_{UserA}], [K_{UserB}], [K_{chain}]$) to obtain the symmetric key matrix $[K]_{static}$ 2113, which was previously derived at server 14.

It is noted that the same key exchange process, with few alterations at most, may be used in the subsequent phases to renegotiate keys.

Figure 4:
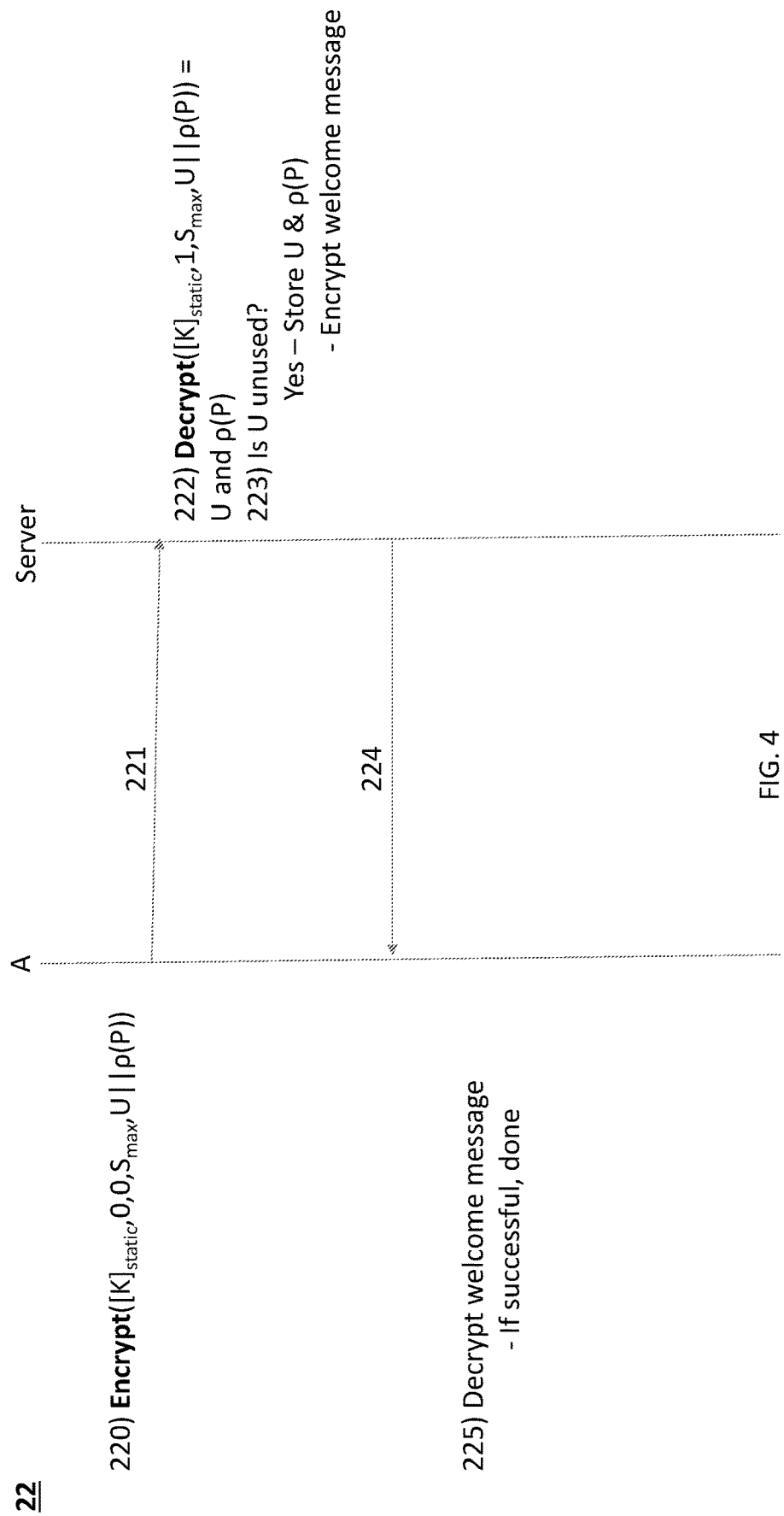
FIG. 4 shows an example of a flow diagram that shows an example implementation of a component of FIG. 2, according to aspects of the present disclosure.

The protocol may then continue with credential registration 22. This may be used to securely establish the authenticity of the user using the device 11. FIG. 4 shows an example of a flow diagram illustrating such credential registration according to an aspect of the present disclosure. To perform credential registration, User A 11 may obtain Encrypt ($[K]_{static}$, 0,0, $S_{max}$, U∥ρ(P)) 220 and send it 221 to server 14. Upon reception, server 14 may execute Decrypt ($[K]_{static}$, 1, $S_{max}$, U∥ρ(P)) to obtain U and ρ(P) 222. Server 14 may then check to determine if username U is unused 223, and if so, then server 14 may store U and ρ(ρ(P)) to a backend, which may be a local file system or a remote database (in the latter case, TLS may be used to provide security; however, the invention is not thus limited). If U is already used, server 14 may return an error message to User A 11, and processes 21, 22 may need to be repeated. Once username U has been stored, server 14 may send an encrypted welcome or acknowledgment message to User A 224. If User A successfully decrypts the message 225, then the registration phase is concluded (and should decryption fail, while highly unlikely, the previous processes may need to be repeated, as User A 224 would not be able to use the present symmetric key matrix and credentials (username/password) to login).

Figure 5:
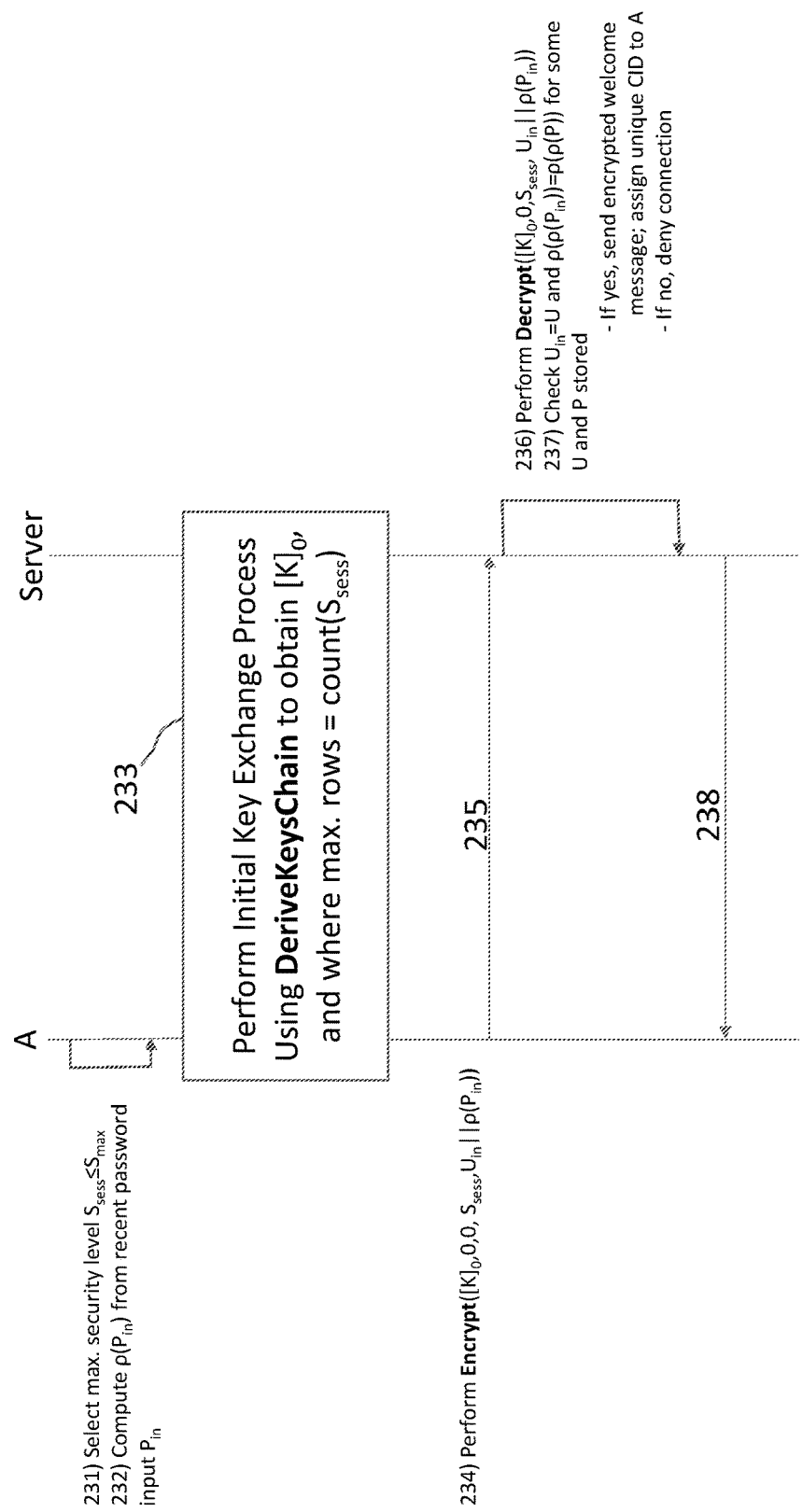
FIG. 5 shows an example of a flow diagram that shows an example implementation of a component of FIG. 2, according to aspects of the present disclosure.

Once a user has completed client-to-server registration 21, 22, the user may then engage in client-to-server connection 23. An example of this is shown in FIG. 5. According to aspects of the present disclosure, User A 11 may select 231 a session security level $S_{sess}$ that is less than or equal to a maximum security level, which may be determined by a number of bits available for representation of the security level. A cryptographic hash of a user-entered password, $P_{in}$, i.e., ρ($P_{in}$), may be computed 232 by User A 11. Then, User A 11 and the server 14 may engage in the initial key exchange process 233, as previously described (see FIG. 3 and its discussion above), using DeriveKeysChain to obtain symmetric key matrix $[K]_0$, where the number of rows in $[K]_0$ may be determined in accordance with $S_{sess}$. After establishment of the symmetric key matrix $[K]_0$, User A 11 may then perform Encrypt ($[K]_0$,0,0,$S_{sess}$,$U_{in}$∥ρ($P_{in}$)) 234 and may transmit the result 235 to server 14. Server 14 may then decrypt the transmitted encrypted information 236 and may check the obtained username Um against a stored username U and ρ(ρ($P_{in}$)) against ρ(ρ(P)), based on a stored ρ(P), to verify 237 the username and password of User A 11. If verification is successful, a unique client identification number (CID) may be stored for User A 11, and an encrypted (using $[K]_0$) may be sent 238 to User A 11. Accordingly, user A 11 may be considered to be "logged in" to server 14. If the verification is unsuccessful, the connection may be denied (and an associated message may be sent to User A 11).

Once a user has completed client-to-server registration 21, 22, as well as client-to-server connection 23, the user may then be able to initiate and engage in secure communications with another user, on a peer-to-peer basis. The initial phase of this further aspect of the present disclosure may be peer-to-peer registration 25, an example of which may be found in the flow diagram of FIG. 6. In the peer-to-peer registration phase 25, the server 14 may act as an observer of the registration between peers to assist in Network Address Translation (NAT) traversal and peer discovery for the peer-to-peer connection phase 26 (and it should be noted that the "peers" are the users 11-13). In this phase, it should be understood that packets sent between a user, e.g., User A 11, and the server 14 and to the desired user, e.g., User B 12, may be encrypted using the symmetric key matrices generated in the client-to-server connection phase 23 for each of the users. Consequently, the trusted server 14 may decrypt and re-encrypt the ciphertext payload as each packet is transmitted from User A 11 to User B 12 via server 14. Additionally, should multiple servers 14 be involved, at least one additional step of decryption and re-encryption may be carried out, for the communications between trusted servers 14 with which User A 11 and User B 12 are respectively registered. Again, as noted above, subsequent discussion will focus on the scenario with a single server 14, but the procedures are applicable to the multi-server scenario, as well.

It should be noted that each user 11-13 (or "peer") connected to the server 14 may be endowed with a unique client identification number (CID) derived during the client-to-server registration phase 21, 22. This may be randomly assigned (server 14 may check to ensure that no two users receive the same CID) and may be used for identification during peer discovery. According to an aspect of the present disclosure, in response to a request to communicate securely with a peer device 241, the server 14 may furnish a registered client (user) wishing to communicate securely, and again we will choose User A 11 as an example, a set of CIDs 242, from which User A may then choose in order to post one or more peer-to-peer registration requests, e.g., a registration request with User B's CID 243. The user Internet Protocol (IP) addresses may typically not be needed to create peer-to-peer connections because they are only known by server 14 (the IP address of each peer may not be made known to the other peer until after registration and during the peer-to-peer connection phase 25, where NAT traversal is attempted).

Assume that two peers User A 11 and User B 12, both registered to a trusted server 14, wish to communicate with each other. Before the two peers connect, one of them may post a registration request containing the unique CID of the other peer 243. In the hypothetical case shown in FIG. 6, User A 11 may post a registration request to server 14 containing the CID of User B 12, as indicated by reference numeral 243. If User B is online, the registration request may be routed to User B 12, as shown by 244, 245. If User B 12 is offline, the message may be stored to the backend (not shown), so it may be sent once User B 12 goes back online.

Once User B 12 receives the registration request, User B 12 may choose to accept or deny it. User B 12 then sends the response 246 to server 14, where the response may be forwarded 247 to User A 11. If User B accepted the request, either User A 11 or User B 12 may then post a connection request to the other in order to engage in encrypted message passing using a unique symmetric key matrix independent of the symmetric key matrices used between the clients and server 14. It is noted that, up to and including this point, and until User A 11 and User B 12 establish a further symmetric key matrix for direct message passing (to be discussed further below), messages sent between User A 11 and User B 12, i.e., between User A 11 and server 14 and between User B 12 and server 14, may use the respective symmetric key matrices previously established between server 14 and the respective users/clients 11, 12.

Figure 6:
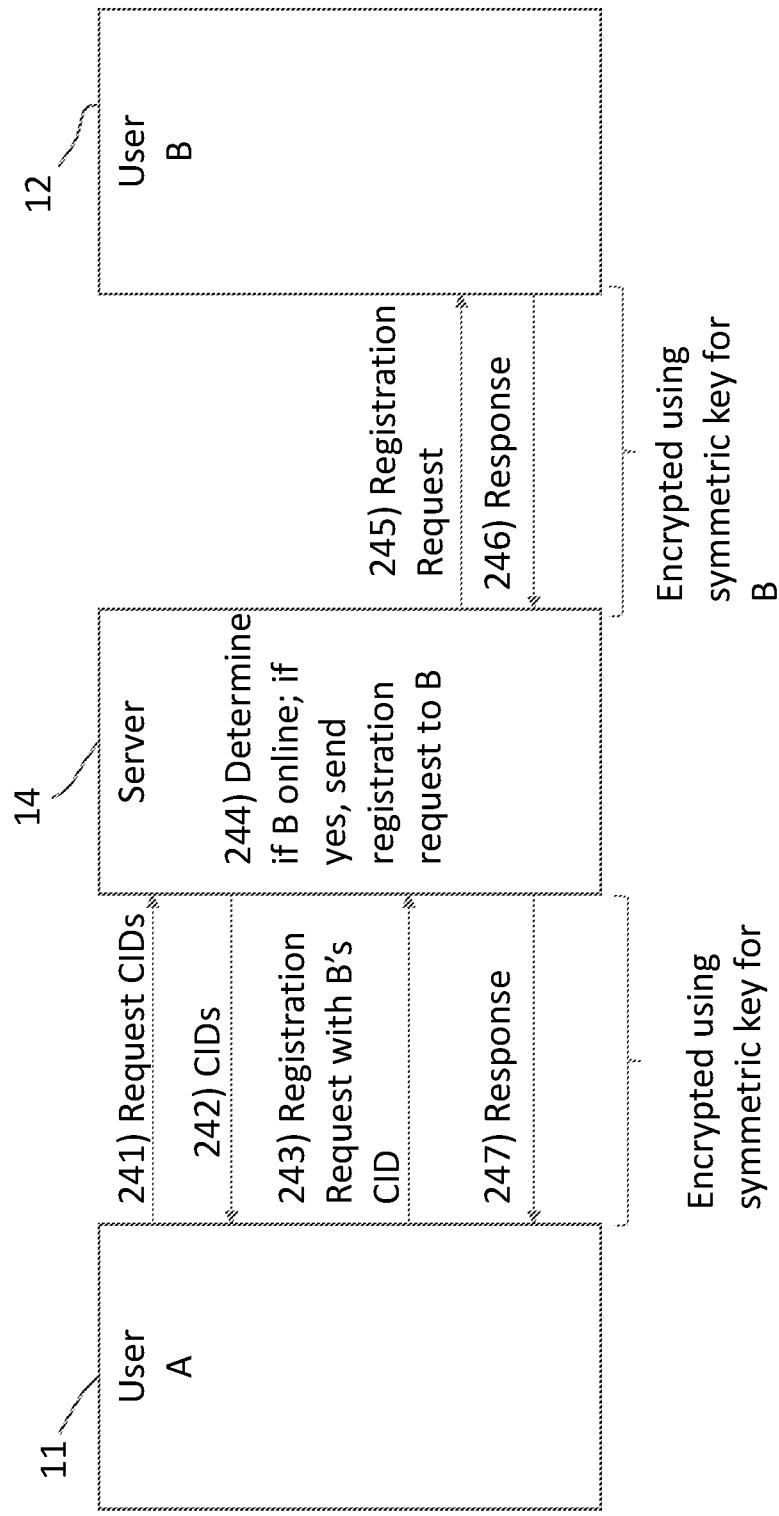
FIG. 6 shows an example of a flow diagram that shows an example implementation of a component of FIG. 2, according to aspects of the present disclosure.

Once two peers, in this case, User A 11 and User B 12, have consented to registration, peer-to-peer connection 25 between the two peers may ensue, an example of which according to aspects of the present disclosure is shown in FIG. 6. The role of the server 14 may be to act as a node behind the NAT of User A 11 and User B 12 to help create a connection between the two peers. Server 14 may also act as an observer to verify that neither registration between the peers has been revoked.

The initial portion of peer-to-peer connection 25 may begin with a process 251 analogous to the initial key exchange 21, but instead of obtaining a symmetric key between a client and server 14, a symmetric key between two clients, in this example, User A 11 and User B 12, may be obtained. In contrast with the establishment of symmetric keys and registration with the server 14, usernames and passwords need not be used in this modification of the key establishment process. In particular, the process 251 may use the DeriveKeysInitial subroutine with server 14 being used as an intermediary node for packet routing between User A 11 and User B 12, and accordingly, User A 11 and User B 12 may establish an initial symmetric key matrix $[K]_0$. In particular, as was the case during peer-to-peer registration 24, data may be exchanged between User A 11 and User B 12 via server 14, with data exchanged between User A 11 and server 14 using the symmetric key matrix previously established between User A 11 and server 14 and with data exchanged between User B 12 and server 14 using the symmetric key matrix previously established between User B 12 and server 14. After the initial symmetric key matrix $[K]_0$ between User A 11 and User B 12 has been established, server 14 may pass the socket addresses of the peers, User A 11 and User B 12, to each other 252a, 252b, which may thereby enable them to attempt TCP hole punching 253, which may be done concurrently with program execution (e.g., while User A 11 or User B 12 performs the process of connecting with other peers). If the TCP hole-punching attempt is successfully completed, the connection between User A 11 and User B 12 may be changed to a direct bi-directional peer-to-peer connection, and message passing 26 may commence using this direct connection 261a. If, on the other hand, TCP hole-punching fails, communication between User A 11 and User B 12 may continue using server 14 as an intermediate node for routing data between the two peers 261b; packets may contain routing information in headers, allowing the packets to be correctly routed. Because the symmetric key matrix $[K]_0$ between User A 11 and User B 12 is only known by User A 11 and User B 12, server 14 may have no knowledge of $[K]_0$.

Messages in system 10 may be passed 26 between two peers 11-13 or a client 11-13 and the trusted server 14 (and vice versa) after the respective connection phase 23, 25 is complete. Message passing 26 may include re-keying 262. Re-keying 262 may be used to ensure a high degree of security by changing the symmetric keys (re-keying may also occur between one or more respective clients 11-13 and trusted server 14, either at the same time or at other times). Re-keying 262 may be initiated by the node that initiated the connection or may automatically occur based on a period set by the node that initiated the connection, or the frequency of re-keying 262 may be determined by the secrecy mode (see below), also set by the node that initiated the connection, via a function that determines re-keying frequency based on the chosen security level. Re-keying 262 may include similar steps to those used in the initial keying processes and may occur between client 11-13 and server 14 or between peers 11-13 (or between servers, in the case of multi-hop secure communications); however, during the re-keying process 262, DeriveMetaChainKey and DeriveKeysChain may be used instead of DeriveKeysInitial. When re-keying 262 occurs, the plaintext of the message to be transmitted may be concatenated and encrypted with the information required to initiate a re-key to both deliver the message and to update the symmetric key matrix on both endpoints, and thereafter, communications between the endpoints may be encrypted using the most recent symmetric key matrix version.

At least two secrecy modes are contemplated, which may include:

1. Perfect Forward Secrecy Mode (PFS) Each packet that is sent outbound from either node may be guaranteed to be encrypted using a unique symmetric key matrix to prevent key re-use. Packets sent out before re-keying is complete may be enqueued for delivery. Enqueued packets may not be sent outbound until being asynchronously triggered by the completion of a re-keying operation.
2. Best Effort Mode (BEM) Messages may be sent outbound independent of whether or not a re-keying operation is in process. If no re-keying operation is in process, a new re-keying operation may be triggered.

A challenge that may occur in BEM is that despite the use of TCP or TLS, order delivery may not be guaranteed. A cryptographic protocol according to aspects of the present disclosure may process packets concurrently, which may thereby allow multiple asynchronous packet processing subroutines to work cooperatively. In an underlying asynchronous runtime, such as, but not limited to, Tokio, order of poll completion may not be guaranteed, so the order in which packets are processed may, in turn, not be guaranteed. As such, a series of synchronization primitives may be used in the protocol to ensure that no conflicts exist even under highly stressed loads.

Figure 8:
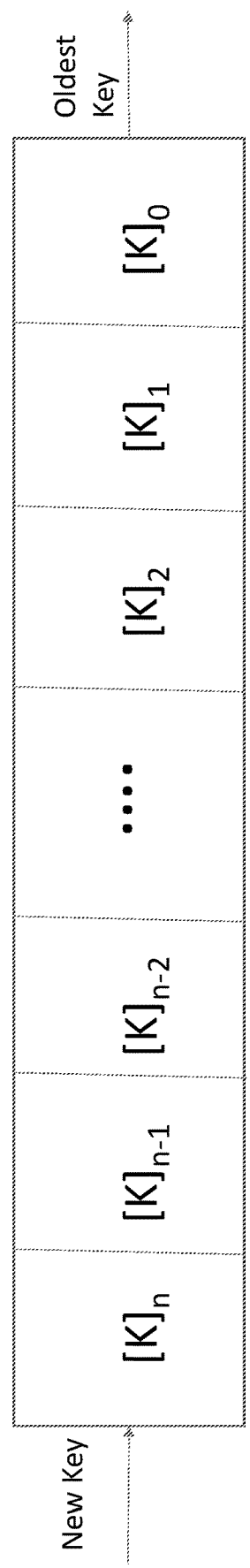
FIG. 8 shows an example of a bounded queue that may be used for storage of symmetric key matrices, according to aspects of the present disclosure.

As re-keying 262 occurs, the version of the symmetric key matrix may continue to increment: $[K]_0 \Rightarrow [K]_1 \Rightarrow [K]_2 \Rightarrow \ldots \Rightarrow [K]_n$. Since in BEM mode, packets of differing versions may arrive, so a history of these symmetric key matrices may be kept in memory in a bounded queue, as shown in FIG. 8, that may discard the oldest element (i.e., the oldest symmetric key matrix, $[K]_0$) after the capacity is reached and a further symmetric key is received. This may be used to help reduce memory usage for storing symmetric key matrices. The length n of the bounded queue may be determined based as a function of network latency, in combination with a predetermined constant. A packet for which the symmetric key matrix needed to decrypt the packet is no longer stored in the bounded queue may be discarded.

The above discussion discusses the use of post-quantum KEMs. However, as of the writing of the present disclosure, NIST has not yet promulgated a list of the KEM(s) for post-quantum use. Until the KEM finalists of the NIST's post-quantum competition are released, cryptographers recommend the use of hybrid cryptography. In a cryptographic protocol according to aspects of the present disclosure, until the post-quantum KEMs are determined, an underlying TLS protocol may be used to encrypt all traffic. To this end, before booting the cryptographic protocol on a trusted central server, a server administrator may specify a PKCS-12 formatted identity, optional TLS domain, and optional password, which may ensure that all clients connecting to the server use TLS to encrypt traffic under the cryptographic protocol.

The cryptographic protocol according to various aspects of the present disclosure may be made resistant to replay attacks by appending an unsigned integer (e.g., a 64-bit integer) at the end of each input plaintext byte sequence to be encrypted. The result of the concatenation may be input into the AEAD algorithm, discussed above. Because processing of packets may typically be unordered, a short history of previously processed packets may be stored at the receiving side and may be checked against the appended integer of a received packet to ensure that no two packets received have the same appended integer.

A cryptographic protocol according to aspects of the present disclosure may further have passive background re-keying determined by the maximum session security level. Background re-keying may occur in both PFS and BEM secrecy modes. When a session is idled, this may help bolster the security of future transmissions. In cases where a hacker captures packets implicated in the key exchange phase in order to begin discovering the symmetric key matrices, passive background re-keying may help by confining the temporal window where a symmetric key matrix is valid; by the time the symmetric key matrix is (hypothetically) discovered, a new symmetric key matrix may be available, forcing the hacker to chase a moving target.

Side-channel attacks via an external application accessing the memory displaced by a cryptographic protocol according to aspects of the present disclosure may be mitigated by using mlock in Linux® and Apple® systems and VirtualLock in Windows® systems. Specifically, any time plaintext or passwords are in memory, a call to the underlying operating system may be made to protect access to the memory. Furthermore, the memory of such information may be zeroed upon drop.

According to a further aspect of the present disclosure, each node in a network, e.g., as in FIG. 1, that operates according to a cryptographic protocol as discussed above may operate as either a client, a server, or both. This implies that a client that makes outgoing connections to other servers (and peers thereon) may simultaneously act as a trusted central server for other peers to which to connect. This may operate similarly to the single and multi-server scenarios discussed above. The interaction between all this traffic may be propagated to a unified NetKernel asynchronous interface, which may permit a developer to create complex network topologies.

In a generalization of the above, a trusted server may not be needed. According to further aspects of the present disclosure, network nodes (e.g., users 11-13) may simply establish symmetric keys with one another, via network 15, and proceed with message passing. That is, the process in accordance with these aspects of the present disclosure may include initial key exchange 21 between the two network nodes, for example, user A 11 and user B 12, and may proceed directly to message passing 26, without the necessity of registration and other processes discussed above, thus dispensing with the server 14. An example of this is shown in FIG. 9.

Figure 7:
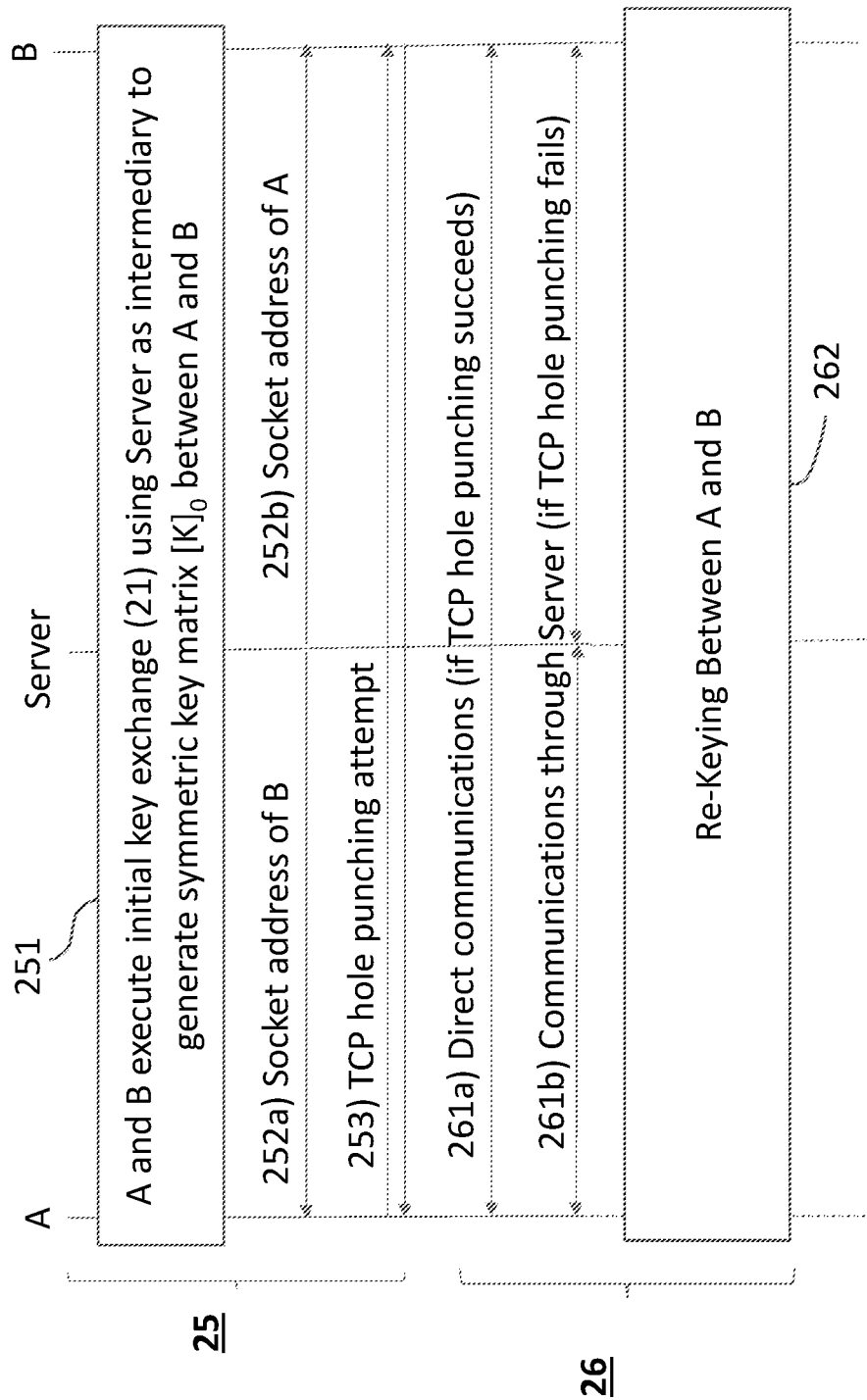
FIG. 7 shows an example of a flow diagram that shows example implementations of components of FIG. 2, according to aspects of the present disclosure.
Figure 9:
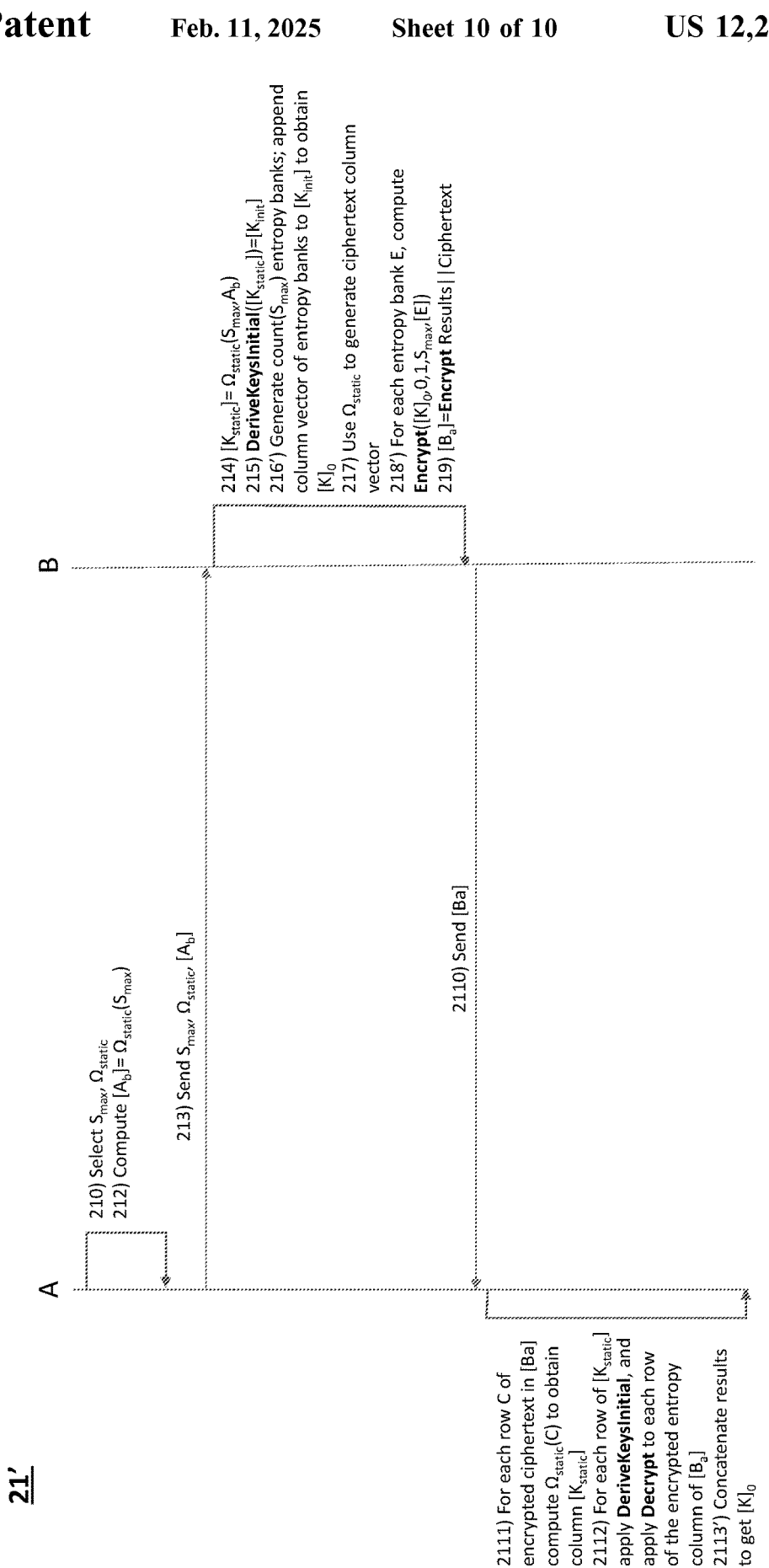
FIG. 9 shows an example of a modified initial keying flow diagram according to aspects of the present disclosure.

As shown in FIG. 9, a modified initial key establishment 21' may be used. This differs from initial key establishment 21 in that a username and password are not necessary and are thus not selected. User B may use $[A_b]$ as above, except that, instead of generating $[K]_{static}$, $[K]_0$ (the symmetric key matrix) may be generated, as indicated in 216', encrypted, as indicated in 218', and transmitted to user A in encrypted form, where user A may decrypt the transmitted information to ultimately obtain $[K]_0$, as indicated in 2113'. Re-keying between user A 11 and user B 12 may proceed as in FIG. 7 and as discussed above. Hence, what is common to various aspects of the present disclosure is the symmetric recursive multi-layered key exchange and use of the resulting multi-layer encryption during communications between nodes ("recursive" may refer to the manner in which the chain of symmetric keys may be generated based upon previous symmetric keys, using DeriveMetaChainKey and DeriveKeysChain as discussed above in connection with the re-keying when a server 14 is initially used as an intermediary).

According to aspects of the present disclosure, the disclosed cryptographic protocol may use local file systems to store required information for data persistence. However, when multiple servers may be used to load-balance traffic, the disclosed cryptographic protocol may also incorporate support to use SQL-type databases (e.g., SQL, SQlite, PostgreSQL for unified data persistence across multiple nodes. When SQL is used, TLS may be required.

In mobile contexts, SQlite may be used for the backend because firebase messages may be delivered asynchronously in the background, triggering sporadic wakeups; by synchronizing data to a database, the protocol need not reload the files each time the protocol boots.

When building mobile applications, a particular challenge is how the operating system (e.g., Android® or iOS®) shuts down the application when in the background. Without execution, ordinary connections between peers may be rendered ineffective. To remedy the issue, according to a further aspect of the present disclosure, the cryptographic protocol may have compatibility with Google® Firebase® to automatically generate custom authentication tokens at the trusted central server. In this way, clients may be able to use the Firebase® realtime database for packet transmission.

According to a further aspect of the present disclosure, at compile-time, a developer may choose between using multi-threaded or single-threaded event loops for the cryptographic protocol. In general, a single-threaded asynchronous event loop may have lower latency and lower maximum throughput, whereas a multi-threaded asynchronous event loop may have higher latency and higher throughput. Choice of using multi-threaded or single-threaded event loops may be based on the intended application. For example, for an edge client, a single-threaded event loop may be better, while for a central server expecting heavy traffic, a multi-threaded event loop may perform better. This may be left as a choice for the developer.

The present cryptographic protocol, according to aspects of the present disclosure, may use an 8-bit field for indicating security level S. Supporting the use of up to 256 layers of multi-layered encryption and PFS/BEM modes may allow developers to balance security and performance. In cases where high security is needed, a developer may select PFS mode at the start of a session (e.g., messaging apps). When speed is a requirement, BEM may be selected instead (e.g., web servers and virtual private networks (VPNs) using a TUN/TAP interface). Because BEM implies that multiple packets/messages may use the same symmetric key for encryption, increasing the maximum security level at the start of each session may allow the developer to apply multiple layers of encryption for each individual message to force a hacker to discover multiple keys instead of just one. In cases where speed is not an issue, and where an extreme degree of security is required, the developer may use PFS coupled with 256 layers of encryption.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A cryptographic method to enable encrypted communications between a first communication node and a second communication node, the method including:

establishing an initial version of a first symmetric key matrix between the first communication node and the second communication node, wherein the first symmetric key matrix comprises an array of symmetric keys containing a number of symmetric keys equal to a first maximum security level equal to an integer greater than or equal to zero, zero corresponding to one level of security using a single symmetric key, and wherein the first maximum security level is chosen by whichever of the first communication node or the second communication node initiates communications between the first communication node and the second communication node, denoted as the initiating node, wherein establishing the first symmetric key matrix includes:

transmitting by the initiating node to whichever of the first communication node or the second communication node is not the initiating node, denoted as the non-initiating node, the first maximum security level, key encapsulation mechanism information indicating a key encapsulation mechanism chosen by the initiating node, and a public key array obtained by the initiating node using the key encapsulation mechanism;

receiving from the non-initiating node an encrypted version of an entropy bank array, encrypted using the first symmetric key matrix, concatenated with a ciphertext array obtained using the key encapsulation mechanism, wherein the first symmetric key matrix is obtained by the non-initiating node by using the first maximum security level, the key encapsulation mechanism, and the public key array to obtain an initial matrix, by applying an initial key derivation algorithm to the initial matrix to obtain an intermediate matrix, and by concatenating the intermediate matrix with the entropy bank array, wherein the entropy bank array contains a number of entropy banks equal to the first maximum security level plus one, which is also equal to a dimension of the intermediate matrix, resulting in the first symmetric key matrix containing a number of symmetric keys equal to the first maximum security level plus one;

obtaining the first symmetric key matrix, by the initiating node, by applying the key encapsulation mechanism to the received ciphertext array and by decrypting the received encrypted version of the entropy bank array; and communicating information to the non-initiating node using the first symmetric key matrix, wherein the initiating node sequentially applies all of the symmetric keys of the first symmetric key matrix to obtain ciphertext messages that are encrypted to a degree equal to the first maximum security level plus one.

2. The cryptographic method according to claim 1, wherein the first maximum security level is greater than or equal to one.

3. The cryptographic method according to claim 1, the method further including:

using a new version of the first symmetric key matrix, obtained by the non-initiating node by applying a recursive algorithm that uses a previous version of the first symmetric key matrix, to obtain a new version of the first symmetric key matrix, and derived from encrypted ciphertext and an encrypted version of a new entropy bank array used in obtaining the new version of the first symmetric key matrix.

4. The cryptographic method according to claim 3, wherein the recursive algorithm includes:

creating a meta chain key by applying a cryptographic hashing function to a concatenation of the symmetric keys forming the previous version of the first symmetric key matrix;

using the meta chain key along with the previous version of the first symmetric key matrix to obtain a new version of the intermediate matrix; and concatenating the new version of the intermediate matrix with a new array of entropy banks to obtain the new version of the first symmetric key matrix.

5. The cryptographic method according to claim 3, wherein the new version of the first symmetric key matrix is derived and used based on a period set by the initiating node, based on an initiation of a re-keying process by the initiating node, or based on a secrecy mode selected by the initiating node.

6. The cryptographic method according to claim 1, wherein the non-initiating node is a server, wherein the method further includes:

selecting, by the initiating node, a username and password;

computing and storing a cryptographic password hash of the password by the initiating node; and registering with the server, including:
encrypting, using the first symmetric key matrix, a concatenation of the username with the cryptographic password hash of the password, and transmitting the result of the encryption to the server; and
receiving an encrypted welcome or acknowledgment message from the server if the server node successfully decrypts the encryption result and is able to successfully register the initiating node using the username.

7. The cryptographic method according to claim 6, the method further including:

selecting an identifier, received from the server, of a further node;

transmitting to the server a registration request including the selected identifier; and receiving from the server a response from the further node via the server, wherein communications between the initiating node and the server are encrypted using a current version of the first symmetric key matrix.

8. The cryptographic method according to claim 7, further including:

initiating, by the initiating node, generation of a second symmetric key matrix with the further node, via the server as an intermediary node; and using the second symmetric key matrix to encrypt communications with the further node.

9. The cryptographic method according to claim 7, wherein the server is coupled to one or more further servers; wherein the further node is registered with the server or with one of the one or more further servers as a registration server for the further node; and wherein, in the case in which the further node is registered with the registration server for the further node, the server is coupled with the registration server for the further node such that it is registered with the registration server for the further node or such that it is coupled to a second one of the one or more servers that is part of a communicative path to the registration server for the further node, wherein each server in the communicative path is registered with at least one other server in the communicative path and communications between pairs of servers in the communicative path are encrypted using symmetric key matrices established between the pairs of servers in the communicative path.

10. A non-transitory computer-readable medium containing executable instructions designed to cause a communications node to implement the method according to claim 1.

11. A communication node including:
one or more processors; and
the non-transitory computer-readable medium according to claim 10, wherein the non-transitory computer-readable medium is coupled to the one or more processors.

12. A cryptographic method to enable encrypted communications between a first communication node and a second communication node, the method including:

establishing an initial version of a first symmetric key matrix between the first communication node and the second communication node, wherein the first symmetric key matrix comprises an array of symmetric keys containing a number of symmetric keys equal to a first maximum security level equal to an integer greater than or equal to zero, zero corresponding to one level of security using a single symmetric key, and wherein the first maximum security level is chosen by whichever of the first communication node or the second communication node initiates communications between the first communication node and the second communication node, denoted as the initiating node, wherein establishing the first symmetric key matrix includes:

receiving from the initiating node at whichever of the first communication node or the second communication node is not the initiating node, denoted as the non-initiating node, the first maximum security level, key encapsulation mechanism information indicating a key encapsulation mechanism chosen by the initiating node, and a public key array obtained by the initiating node using the key encapsulation mechanism;

deriving, at the non-initiating node, the first symmetric key matrix, the deriving comprising using the first maximum security level, the key encapsulation mechanism, and the public key array to obtain an initial matrix; applying an initial key derivation algorithm to the initial matrix and concatenating an entropy bank array to obtain the first symmetric key matrix, wherein the initial matrix, the entropy bank array, and the first symmetric key matrix all have a dimension equal to the first maximum security level plus one;

encrypting the entropy bank array using the first symmetric key matrix to obtain an encrypted entropy bank array;

obtaining a ciphertext array using the key encapsulation mechanism;

concatenating the encrypted entropy bank array and the ciphertext array and transmitting the concatenated encrypted entropy bank array and ciphertext array to the initiating node to use to derive the first symmetric key matrix by decrypting the ciphertext array using the key encapsulation mechanism to obtain decrypted ciphertext and applying the initial key derivation algorithm to the decrypted ciphertext and decrypting the encrypted entropy bank array; and communicating information to the non-initiating node using the first symmetric key matrix, wherein the initiating node sequentially applies all of the symmetric keys of the first symmetric key matrix to obtain ciphertext messages that are encrypted to a degree equal to the first maximum security level plus one.

13. The cryptographic method according to claim 12, wherein the first maximum security level is greater than or equal to one.

14. The cryptographic method according to claim 12, the method further including:

deriving a new version of the first symmetric key matrix by applying a recursive algorithm that uses a previous version of the first symmetric key matrix to obtain a new version of the first symmetric key matrix; and transmitting to the initiating node encrypted ciphertext obtained using the key encapsulation mechanism and an encrypted version of a new entropy bank array used in obtaining the new version of the first symmetric key matrix, wherein the new entropy bank array is encrypted using the new version of the first symmetric key matrix.

15. The cryptographic method according to claim 14, wherein the recursive algorithm includes:

creating a meta chain key by applying a cryptographic hashing function to a concatenation of the symmetric keys forming the previous version of the first symmetric key matrix;

using the meta chain key along with the previous version of the first symmetric key matrix to obtain an intermediate matrix; and concatenating the intermediate matrix with the new entropy bank array to obtain the new version of the first symmetric key matrix.

16. The cryptographic method according to claim 14, wherein the new version of the first symmetric key matrix is derived at a time based on a period set by the initiating node, based on an initiation of a re-keying process by the initiating node, or based on a secrecy mode selected by the initiating node.

17. The cryptographic method according to claim 12, wherein the non-initiating node is a server, wherein the method further includes registering the initiating node at the server, wherein the registering includes:

receiving from the initiating node a username selected by the initiating node concatenated with a cryptographic password hash of a password selected by the initiating node, wherein the concatenated username and cryptographic password hash of the password are encrypted using the first symmetric key matrix;

attempting to decrypt the encrypted concatenated username and cryptographic password hash of the password using the first symmetric key matrix; and if the attempting to decrypt is successful: (a) storing the username and cryptographic password hash of the password; and (b) transmitting an encrypted welcome or acknowledgment message to the initiating node.

18. The cryptographic method according to claim 17, the method further including:

receiving, from the initiating node, a request to initiate a communication;

sending a list of node identifiers to the initiating node and receiving a registration request from the initiating node containing a node identifier corresponding to a further node;

forwarding a registration request to the further node and receiving a response from the further node; and transmitting the response to the initiating node, wherein communications between the initiating node and the server are encrypted using a current version of the first symmetric key matrix, and wherein communications between the server and the further node are encrypted using a second symmetric key matrix established between the server and the further node.

19. The cryptographic method according to claim 18, further including:

acting as an intermediary between the initiating node and the further node to enable the establishment of a third symmetric key matrix between the initiating node and the further node.

20. The cryptographic method according to claim 18, wherein the server is coupled to one or more further servers; wherein the further node is registered with the server or with one of the one or more further servers as a registration server for the further node; and wherein, in the case in which the further node is registered with one of the one or more further servers, the server is coupled with the registration server for the further node such that it is registered with the registration server for the further node or such that it is coupled to a second one of the one or more servers that is part of a communicative path to the registration server for the further node, wherein each server in the communicative path is registered with at least one other server in the communicative path and communications between pairs of servers in the communicative path are encrypted using symmetric key matrices established between the pairs of servers in the communicative path.

21. A non-transitory computer-readable medium containing executable instructions designed to cause a communications node to implement the method according to claim 12.

22. A communication node including:

one or more processors; and the non-transitory computer-readable medium according to claim 21, wherein the non-transitory computer-readable medium is coupled to the one or more processors.

* * * * *